INVENTOR.
Clark C. Heritage
BY W. Bartlett Jones,
Attorney

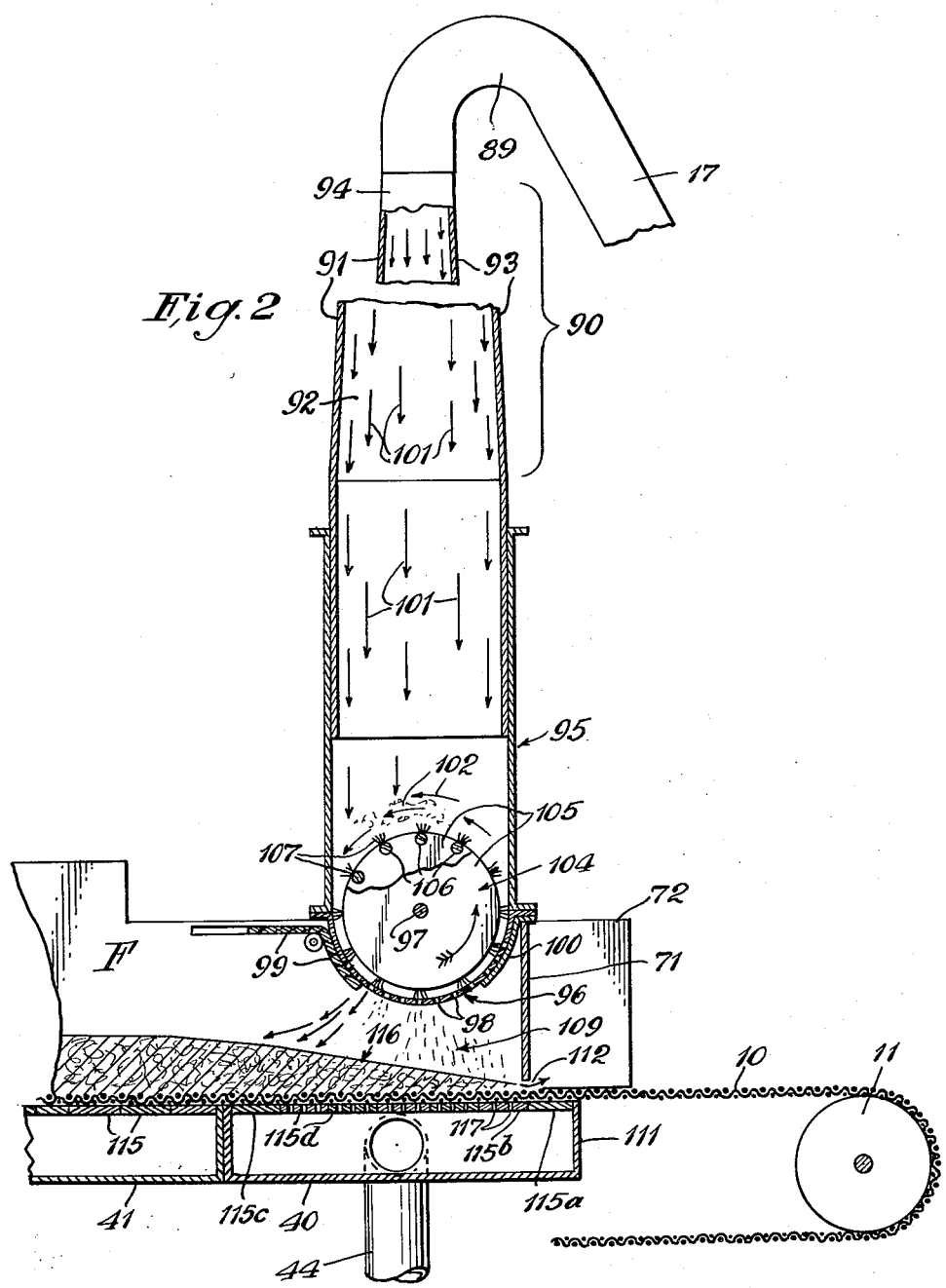

July 25, 1961  C. C. HERITAGE  2,993,239
PRODUCTION OF INTEGRAL LAYERED FELTS
Filed Nov. 8, 1954  3 Sheets-Sheet 3
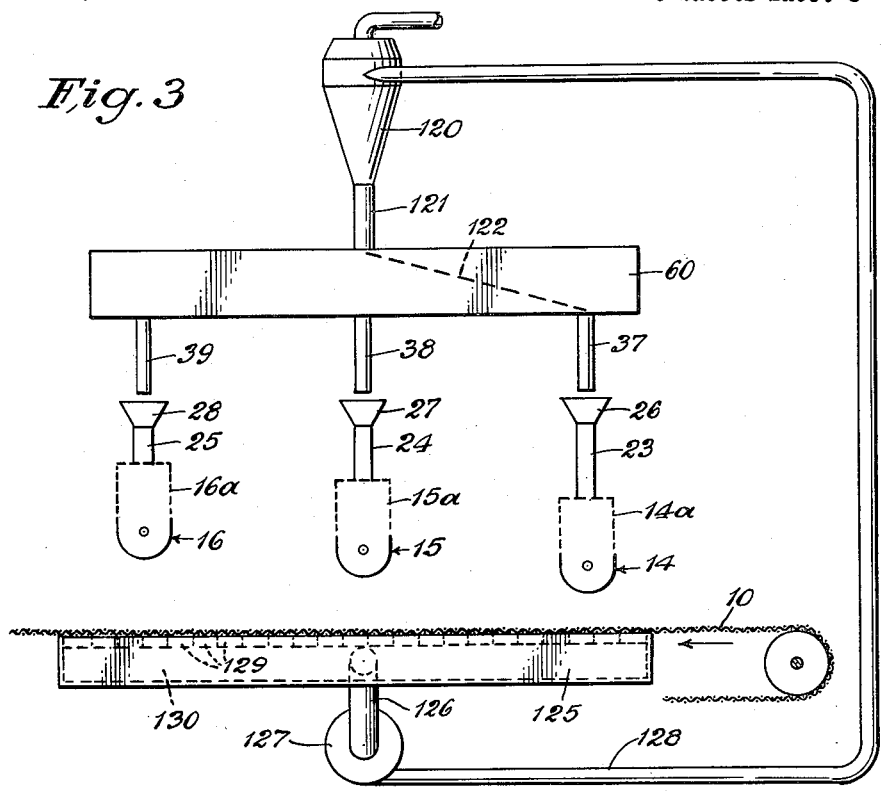
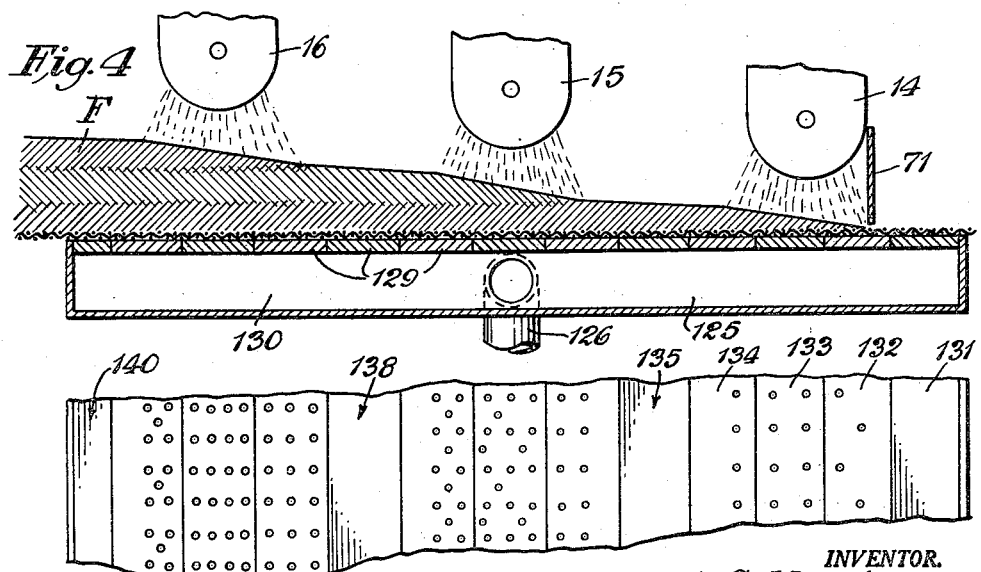
INVENTOR.
Clark C. Heritage
BY W. Bartlett Jones
Attorney 2,993,239
PRODUCTION OF INTEGRAL LAYERED FELTS
Clark C. Heritage, Tacoma, Wash., assignor, by direct and mesne assignments, of one-half to Weyerhaeuser Company, a corporation of Washington, and one-half to Wood Conversion Company, St. Paul, Minn., a corporation of Delaware
Filed Nov. 8, 1954, Ser. No. 467,347
35 Claims. (Cl. 19—156)

The present invention relates to the formation of unbonded fiber mats suitable for subsequent bonding with or without consolidation to form more dense fiber products including particularly hard fiberboard.

It is conventional to deposit fibers of one kind in a single step to form an integral felt as a mat for subsequent bonding or consolidation, as for example by hot-pressing to form hard fiberboard. The fiber carries or has added to it during the process of felting a bonding agent which may be, or which may include, substance derived from the fibers themselves, and which may be, or may include one or more added substances, such as thermosetting resin, water-resisting agents, solid bodies, coloring agents, bark ingredients, so-called products of wood rot, and many others. One advantage of so forming an integral felt is the faculty of forming two like faces in hot-pressing. One disadvantage is that where high-quality material is used for at least one high-quality face, there is an uneconomic use elsewhere in the mat of such high-quality material.

It has been proposed to form laminated products in various ways to minimize use of high-quality content at the interior of the mat or otherwise at a region beyond a single desired high-quality face. One difficulty with such laminated products is a resulting line of cleavage at the interface.

In forming high-grade air-laid felts, it is important to deliver the fibers in substantially individualized condition, thus to minimize clotting of fibers. Fibers pneumatically conveyed tend to clot, especially where the gaseous suspension thereof impinges on the walls of the conduits or the like in conveying the suspension. One way to overcome the effect of clotting is to effect a final dispersion or individualization of the fibers shortly before delivery to the place of deposition. This may be effected by mechanical means using conventional dispersing principles.

In forming integral layered felts, it is most desirable that each layer be well felted, that all the layers be felted to substantially the same degree, and that the fibers of adjacent layers be interfelted to substantially the same degree as the layers themselves, where the fibers of the layers have substantially identical felting properties. Of course, these ideal conditions cannot exist where the fibers are different in kind, or have different particle-size distribution, or have different felting properties, and where the material deposited as adjacent layers contains additives or filler material not necessarily of feltable particle form. One way to secure substantial uniformity of felting of fibers in air-laid felts thereof is to so control the impact of deposition that all the fibers are deposited with substantially the same impact, or within the same controlled range of impacts. Thus, they tend to form uniform felts and each depositing fiber tends to penetrate the formed felt to the same extent. The impact predetermines the density of the resulting felt and commensurately the degree of penetration of each depositing fiber into the felt.

Where felted mats are used for consolidation to denser forms, as for example in making hardboard by high-temperature hot-pressing, a large bulk of material is present in the felt. Desirable surface character for such products calls for selected material as the face layers of the mat, and commonly more expensive material is required than need be present internally. The present invention permits many combinations of different materials in the mat, for securing special physical properties, desirable surface, and numerous economies in material and processing.

In hot-pressing mats, to form hardboard for example, moisture content in the mat plays an important role in the character of product produced. The total moisture content is important as well as its distribution layerwise parallel to the faces of the mat. The present invention permits forming mats in layers with different moisture contents in adjacent layers as a means for control of processing and product.

The present invention concerns deposition of a layer of fiber by impact, and by the term "impact" is meant a force greater than that of gravity fall. To create and regulate the impact, the invention contemplates control by regulation of air pressures. Since the invention also concerns depositing multiple layers by such impact felting, it is directed to a process such that the exposed surface of one deposited layer, as formed or as forming, is always exposed to air at substantially atmospheric pressure, whereby the mat may be formed without mechanical disturbance of its growing or final face.

One way to control impact or deposition is to direct an air dispersion of substantially individualized fibers onto a foraminous member with control of the differential air pressure in the resulting felting operation. A practical way to effect this result is to expose the felt-carrying face of the foraminous member to atmospheric pressure, to apply to the other face subatmospheric pressure at an area comprehending the deposition zone into which the air-suspended fibers are directed, and to discharge the fibers in air toward the foraminous member from a region of superatmospheric pressure. A mat is thus formed substantially at atmospheric pressure with two terminal pressures subject to control. As the mat thickens its resistance to passage of air increases, thus under ideal conditions calling for a compensating increase in the suction applied. Where layers of fibers are formed from independent air dispersions, it is essential that one dispersion be deposited on a felt already formed from another dispersion. Any felt receiving the same or different fibers for integral felting is preferably of a density and structure within limits substantially the same as the density and structure of the felt to be grown upon it.

In discharging air to the felt being formed and in drawing air through the felt being formed, while the area being felted is open to the atmosphere, there must be a balance in air flow such that substantially all the air which carries the fibers is drawn through the felt. Otherwise, any excess not so drawn through must escape into the atmosphere and carry fibers with it. Preferably, the air flows are such that air from the atmosphere is drawn through the felt in addition to the air carrying the fibers, although there are some circumstances in which a slight unbalance may obtain, for example, to cause a slight outflow of fiber to drop lightly onto a final felt surface for texture effects.

Thus, by the method of impact felting of one layer on a foraminous member free to move at atmospheric pressure into and out of a depositing region without mechanical disturbance of the surface of the felt, a second and similar type of felting may be practiced to form a new layer of which the initially deposited fibers by impact penetrate the first layer and thereby integrally felt the two layers.

It is a general object of the invention to form an air-laid felt by depositing one layer of fibers on another with interfelting at the interface, thus to increase the rate of formation, to permit a variation in content of adjacent layers, to permit providing material for one or both surface layers such that desirable surface properties may be achieved, to permit incorporating lower-grade material at the interior, to permit varying degrees of moisture-content in adjacent layers, and for numerous other advantages.

It is a particular object of the invention to form an integral felt composed of a plurality of separately deposited layers.

It is a particular object of the invention to form a multi-layered felt on a conveyer by moving the conveyer through a plurality of successive zones at substantially atmospheric pressure wherein fibers are deposited by controlled impact.

It is a particular object of the invention to form a multi-layered integrally felted mat which may be hot-pressed to form hard fiberboard of controlled characteristics.

Various other objects and advantages of the invention will become apparent from the following description and explanation of the invention with reference to the accompanying drawings in which:

FIG. 2 is a fragmentary detailed illustration in cross-section showing the general structure of each felting unit, illustrating particularly the rear end unit.

FIG. 3 is a diagrammatic illustration of a modified apparatus having three felting stations, as in FIG. 1, but showing a single suction box and a single cyclone therefor.

FIG. 4 is an enlarged vertical cross-section of a portion of the modification of FIG. 3 as it appears in action in forming a mat.

FIG. 5 is a fragmentary plan view of the platform formed by the removable plates over the single suction box of FIGS. 3 and 4, illustrating the increasing area of perforation as the forming mat thickens.

Figure 1:
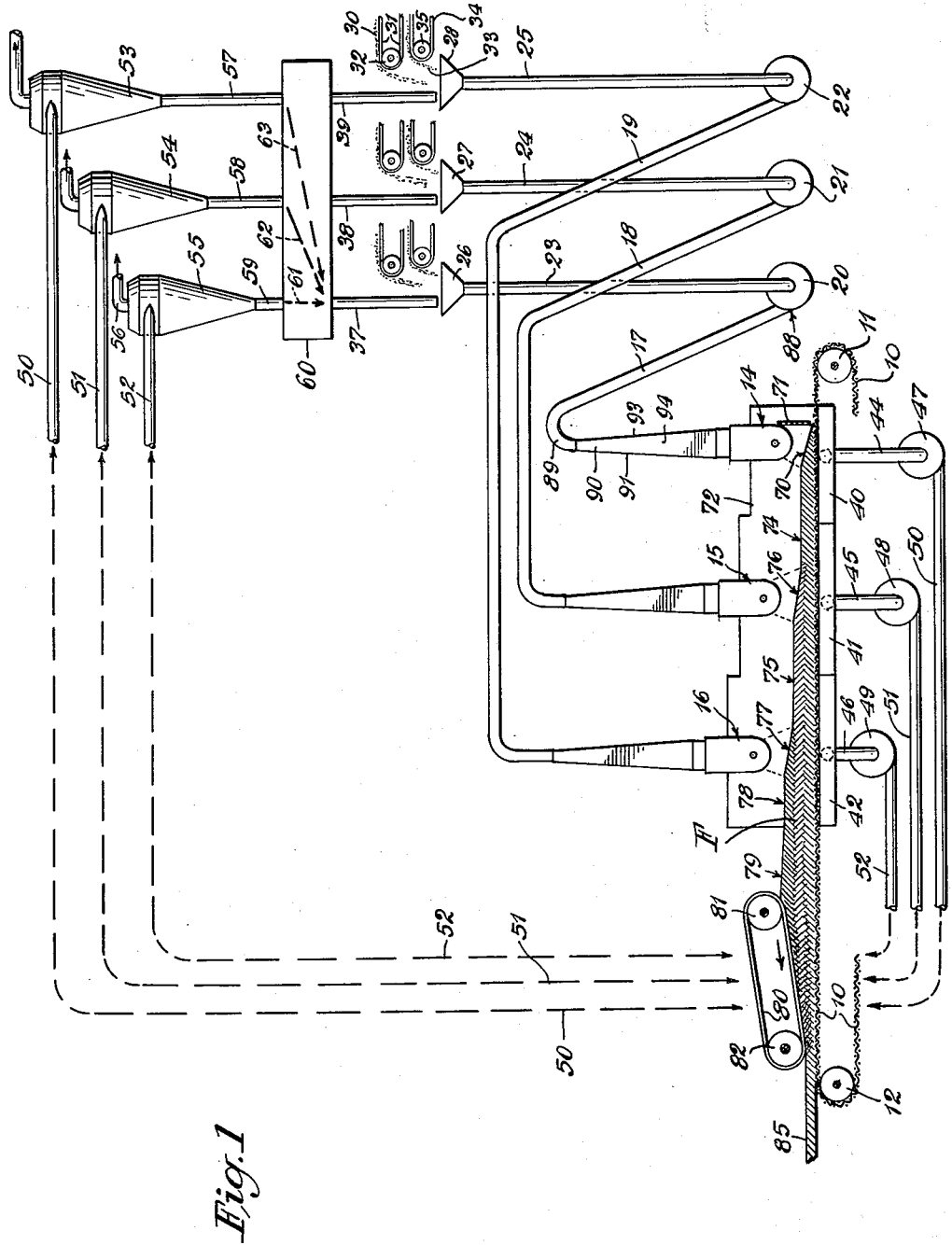
FIG. 1 is a diagrammatic drawing of the apparatus as a whole indicating the relation of three felting stations but not necessarily showing accurate locations.

For manufacture of high-quality felts to be consolidated to uniformly thick high-density panels, special apparatus is needed to assure the continuous formation on a moving conveyor of a felt having uniformity of thickness and of density, which are criteria for high-quality hot-pressed hard fiberboard. Such apparatus is limited in its rate of felting to secure these desired results. Fiber concentrations in air must not be too high with respect to any given distance of travel and to the particular kind of fiber, or clotting will result in which case substantially individualized fibers are not deposited. A practical consideration then is to use a sequence of dispersing units to increase the capacity over that of a single dispersing unit. However, unless a sequence of such units is properly related and operated, a laminated felt will result with planes of cleavage manifest in the consolidated product.

In carrying out the invention in its broadest aspect, the method may be practiced with a stationary foraminous member by employing a timed succession of air-laying operations involving felting by impact, but it is preferably carried out on a moving endless foraminous conveyer which traverses a sequence of depositing zones all in simultaneous operation, thus to perform a sequence of impact depositions at any selected portion of the moving conveyer.

In the preferred practice of the invention, there are provided a plurality of dispersing units, preferably substantially identical, each having a dispersing head over its own deposition zone, and all in a sequence along the path of the moving conveyer which is exposed to the atmosphere for formation of a mat at substantially atmospheric pressure. Thus, the formed felt may be removed from each and all of the several depositing zones without contact of its felted face with means such as is otherwise necessary to lead a formed mat into a region of one pressure from a region at a different pressure. Under the moving conveyer, there is means providing controlled suction under an area or areas comprehending at least the area of each depositing zone. Preferably there is a sequence of suction boxes, one for each dispersing head, and each suction box presents an area at least comprehending the deposition zone of its respective dispersing head. The suction boxes may be contiguous or spaced apart. The suction imposed on the felt at the regions of deposition may increase in the direction of travel of the conveyor as the felt thickens, and the increase may be such that substantially the same order or degree of impact of deposition is effected at each depositing zone. Each dispersing head may vary as to the degree of superatmospheric pressure within it, and as its distance above the surface below, as an additional control functioning with the underlying suction, to control the degree of impact on deposition. Because the growing thickness of the felt increases the resistance to passage of air, the differential pressure acting on the thickness of screen plus felt must increase from one dispenser to the other. The suction may be graded within a single suction box or the several ones by imposing fixed graded areas of resistance between the open suction area of the suction box and the conveyer above it, as described in the application of Roberts, Serial No. 334,170, filed January 20, 1953, now Patent No. 2,912,723.

When a felt, exposed to atmospheric pressure on the conveyer, leaves an area of suction, it expands by change from differential air pressure to uniform atmospheric pressure. Thus, the first formed layer at its low density of formation may be made to become less dense by such expansion. Then in traveling into and through the succeeding suction area, it is again compressed by differential air pressure. The suction applied at any time is so chosen that the felt retains a sufficiently low density with consequent open porous character that the individualized fibers next encountered in a depositing zone may enter the felt, interfelt therewith, and then grow as a newly felted layer.

Any expansion of a felt followed by compaction, either by differential air pressure or by mechanical means, works the fibers into new relationships, thereby increasing the homogeneity of felting from face to face. By one permitted practice in the present invention, this effect may be achieved by releasing the felt from suction between the deposition steps. When the mat leaves the last area of suction, it is preferred to have a density in the range from 1.5 to 6 pounds per cu. ft. while under the influence of suction. It may be allowed to expand by full exposure to atmospheric pressure, or it may be held mechanically against expansion and then mechanically compressed to a higher and handleable density permitting its removal from the conveyer. Where the final form of the felt has a much greater density than the original felt, as a result of mechanical compressing in further processing, the additional degree of interfelting achieved by change of air pressure as described above is negligible in effect, and may be dispensed with.

In my copending application Serial No. 334,163, filed January 30, 1953, now Patent No. 2,940,135, there is described apparatus providing a single depositing zone. The present invention may be practiced by suitably relating and modifying a plurality of such units in line over a single foraminous conveyer common to all. In said prior application, there is disclosed a fiber disperser above a conveying screen, thus forming a fiber depositing zone the area of which is comprehended by the opening of a suction box under the screen. The disperser in operation contains fiber and air at superatmospheric pressure. A foraminous head on the disperser discharges air and individualized fibers toward the conveyer for felting the fibers therein. Suction under the conveyer draws in substantially all the air passing through said head and preferably some additional air from the atmosphere, thus to keep the surrounding air free from fiber and also to permit the screen to be exposed to the atmosphere.

Fiber and any desired additives, for example a synthetic resin powder to function as bond, are suitably fed continuously into the disperser, and as disclosed, the preferred method is to feed such material to the intake opening of a blower which supplies air to maintain superatmospheric pressure in the fiber disperser. To maintain the proper balance of air, the said blower and a suction blower connected to the suction box, are subject to independent control as to the capacity and constancy thereof for continuous operation. This is effected in part by the disperser's blower drawing from atmospheric pressure, and the suction blower discharging into atmospheric pressure.

In felting fibers so carried in a stream of air, there are fines which pass the screen, and where comminuted additives are present, a fraction thereof may pass to augment the fines. When infeed material for the disperser is a mixture proportioned as to content, it is important to return the fines to maintain said proportion. Accordingly, the air from the suction box is cleansed of its content of fines, which are returned to the disperser infeed.

To do this and to discharge the suction air into atmospheric pressure, suitable means such as a cyclone is employed, which separates fines, or a mixture of fines and air in quantity less than the discharge, and returns the fraction which is or which contains the fines to the disperser.

According to the present invention wherein there is a plurality of two or more depositing stations, the apparatus is made flexible by providing three complete depositing stations, any one of which may be used alone, in accordance with said prior application Serial No. 334,163. Thus, all but one station may be out of service for repair or other reason without necessity to cease operations. Each deposition zone has its independent pressurized disperser, its independent pressure blower, its independent suction box and suction blower, and its own fines-separator, specifically a cyclone. However, connections are provided for numerous variations in operation.

By having a plurality of successive depositing zones through which a filtering conveyer travels, the following are among the various possibilities in processing:

(a) All zones deposit the same material, permitting a faster rate of production of a given felt.

(b) The solids content for one face layer differs from that of another layer.

(c) The solids content of each face layer differs from that of another layer.

(d) The fibers of one face layer have a different particle-size distribution from the fibers of another layer.

(e) The fibers of both face layers have a different particle-size distribution from the fibers of another layer.

(f) The material deposited for each layer differs from the material of the remaining layers.

(g) The moisture-contents of the material of two adjacent layers are different.

(h) The material of any two layers may differ only in moisture content.

When two or more stations are in operation, the fines predominate at the first station, because the felt formed in the first station filters out fines entering the second station. Practical experience dictates the advisability of returning the fines from all stations to the first station, which loses a larger proportion as fines. This may be done in numerous ways. All the discharges of air from the several stations may be combined before separating, thus combining the fines. However, because each station in the preferred arrangement has its own fines-separator, the fines are preferably combined after their individual separations. By this expedient, no control difficulties are encountered by mixing the discharged air currents from the several suction boxes. As will be explained hereinafter, the fines of each station, or of any number or of all, may be delivered to any one or more of the infeeds for the several stations.

FIG. 1 shows the general arrangement, with respect to which details of structure are given hereinafter.

Numeral 10 represents an endless screen conveyor on which fibers are felted from air currents passing through. The conveyor moves to the left in FIG. 1 over end rolls 11 and 12, one or both of which are driven at constant speed. Over the conveyor are a plurality of fiber dispersers spaced apart in the direction of movement of the conveyor 10. Each disperser with associated parts constitutes a station or depositing zone, and although any number upwardly from two is contemplated, only three are shown, for simplifying illustration, and also because three present advantages not obtainable with two. Therefore, the following description is directed specifically to the disclosed three stations of FIG. 1 without intention to limit the invention to three or to the details chosen for illustration.

The three dispersers are designated 14, 15 and 16, respectively connected by conduits 17, 18 and 19 to their respective blowers 20, 21 and 22. The illustrated extent of conduits and locations are not significant, except where later specified herein, and are chosen more or less diagrammatically to facilitate illustration. Each blower has its respective intake conduit 23, 24 and 25, from its respective infeed hopper 26, 27 or 28. Into the hopper for each station is fed material for deposition, and also any recovered fines which are to be included.

For example, the hopper 28 is positioned to receive material 30, which is fiber as an example, at a predetermined rate from a feeding belt 31 discharging as it returns over end-roll 32. Any second material 33, which may be another kind of fiber, or an additive, such as bonding powder, is likewise fed in at a fixed rate by similar means having belt 34 over end-roll 35. To the hoppers 26, 27 and 28 are directed conduits, respectively designated 37, 38 and 39, for returned fines.

Under the conveyor 10, the illustrated suction means consists of a plurality of suction boxes each comprehending the full area of a depositing zone, these being designated 40, 41 and 42 respectively for the dispersers 14, 15 and 16. The boxes are preferably contiguous, and comprehend more than the area in which they function, to permit the face of the box adjacent the screen to be baffled by closed or perforated plates as later described. The suction boxes are connected by conduits 44, 45 and 46 to suction blowers respectively designated 47, 48 and 49. The suction blowers are connected by conduits 50, 51 and 52 respectively to independent cyclones 53, 54 and 55. Each cyclone discharges to the atmosphere all or part of the air delivered to it through a vent, such as vent 56 on cyclone 55. The separated fines of the cyclones discharge respectively via conduits 57, 58 and 59, for connection as desired to conduits 37, 38 and 39. Numeral 60 indicates a connection box which represents valves and conduits by which said desired connections may be made. The dotted lines 61, 62 and 63 represent connections whereby all the fines of the three stations are returned to the initial disperser 14 via conduit 37.

By operating all three stations, a felt F is begun under disperser 14, as represented by the inclined section 70, formed initially at a region beginning at the end baffle 71 between vertical deckle plates over the screen 10, of which one continuous deckle plate is shown at 72. The deckle plates 72 extend along the length of the forming region, and as shown are stepped to correspond to the incline on which the several dispersers are located.

The dispersers are preferably arranged so that their active depositing zones at the face of the forming felt are spaced apart, thus giving areas 74 and 75 free from depositing fibers, and respectively connecting the growing inclined felt faces 70 and 76, and 76 and 77. In these spaces, the mat may be inspected, or facewise treated or otherwise acted upon. After the last depositing zone which forms inclined face 77 the formed felt F is shown as flat at 78 when subjected to suction from box 42. Leaving the area of suction, it expands slightly as represented by incline 79. By blocking a portion of the suction boxes under a portion of the flat areas 74 and 75, an expansion may occur followed by a compression by suction, whenever desired.

Felt F may be mechanically compressed after the final deposition by suitable means. The lower the density of initial formation, the more uniform is the felt as to content per unit area, but such low densities for such purpose characterize felts with no felting strength enabling them to be easily removed from the conveyor. Hence, it is preferred mechanically to compress the formed felt to a density greater than the density of initial formation. One means for doing this is shown as a compressing unit comprising belt 80 moving at the same speed as the felt, over end rolls 81 and 82. The unit may be set at any desired height and at any desired angle, even to raising roll 81 entirely above the level of the felt. Thus, a strengthened compressed felt 85 may be easily removed.

In further reference to my copending application Serial No. 334,163, it is pointed out that in actual practice, the conduits 17, 18 and 19 lie in a vertical plane passing through the longitudinal axis of the apparatus which is midway between the deckle plates 72, for the purpose of effecting mechanical and processing symmetry with respect to said axis. In consequence, they are vertically superimposed, and their blowers 20, 21 and 22 are alined in said plane for the same reasons. These factors are related to the general detailed structure of the illustrated disperser, which is used as an example of any fiber disperser capable of effecting uniform deposition across the axis of the machine.

The following detailed description of the dispersers applies particularly to disperser 14, which has the baffle plate 71 not present on the others. The described alinement of conduits 17, 18 and 19 and of their blowers 20, 21 and 22 is a matter of great importance. Centrifugal action in each blower loads the air stream in the outlet conduit more at the region designated 88 in conduit 17 than opposite thereto. Equalization of distribution tends to occur to the extent that conduits 17, 18 and 19 are straight and long. Each vertically inclined conduit 17, 18 and 19 is topped by one or more curving portions, for example the gooseneck 89 in conduit 17. The curved portion leads the passageway to a vertical leg having an opening from which an enclosed horn-like housing 90 flares vertically downwardly and symmetrically with respect to the said axis of the apparatus. These curving conduits again introduce centrifugal force which throws a heavier concentration of fibers and the heavier components thereof more toward the wall 91 of the housing 90.

The housing 90 is an expansion conduit for the fiber-air suspension conveyed in the conduit 17. It serves to reduce the velocity so that the impact of conveyed fibers on being arrested in the housing minimizes felting in the housing. It also serves to equalize the air stream over the area discharging to the atmosphere. Since the latter discharging area requires straight sides parallel to the axis of the apparatus, and substantial identity of crosswise conditions between such sides and along every intervening parallel line, the discharging area must be rectangular in its horizontal projection. Accordingly, the housing 90 flares generally downwardly through increasing rectangular cross-sections. For simplicity and economy, this is preferably done by a pyramidal type of structure.

In one exemplary embodiment, the housing 90 flares with a rectangular cross-section from a top opening of 16 x 20 inches to a bottom opening of 30 x 54 inches in a vertical drop of about 26 feet. These dimensions are merely illustrative. Its walls are designated clockwise in FIG. 2 as 91, 92, 93 and 94. For uniformity crosswise of the housing, the periphery of blower 20, and all of conduit 17 including its gooseneck 89 lie in a vertical plane which bisects every horizontal cross-section of the housing longitudinally of the conveyer midway of the deckle plates 72.

The bottom opening of the housing 90 may have a terminal dispersing head or it may be extended by a suitable tubular means, such as a prismatic box-like section 95 with four vertical side walls, for any suitable or desired distance, for example about 5 feet. The rectangular bottom opening of the housing 90 as extended by tubular extension 95 is closed by a perforated head, preferably a semi-cylindrical dispersing head 96 with its horizontal axis 97 crosswise of the apparatus. The extension 95 is shown as telescopic in two sections to permit adjusting the vertical height of the dispersing head 96 above the screen 10.

An arc of about 100° of the periphery is perforated substantially symmetrically of the axis of the apparatus with holes 98 of size to effect substantial individualization of the fibers constituting the charge 30 fed to blower 20. In the case of wood fibers 30 previously liberated substantially as individualized ultimate fibers of the wood, the holes may be $5/16$ inch in diameter and countersunk deeply from the exterior side. The countersinking minimizes the extent of cylindrical wall in the hole and thus minimizes the tendency of the holes to plug and to deliver slugs felted within the hole. The more numerous the holes, the greater the capacity of the ssytem. A wide variety of hole sizes, shapes and arrangements is permitted. In one form, the holes have been aligned along geometrical elements of the head 96 on half-inch centers, staggered in adjacent rows, and said rows spaced on 0.4375 inch centers. A flexible adjustable gate 99, like the closure of a roll-top desk, is positioned to vary the effective arc of perforations. On the opposite side of the head is a semi-permanent closure 100 of sheet metal covering a selected band over the perforations. The closure 100 is fixed for one type of operation in which fine adjustments for the effective discharging area are made by moving the closure 99. The fine adjustments may be required during a particular operation.

In FIG. 2 the arrows 101 in housing 90 indicate the downward course of fibers and air and a heavier concentration of fibers along the wall 91. Numeral 102 indicates arrows representing an agitated stock of fibers in section 95 and dispersing head 96. Fibers 102 are maintained in agitation by suitable means. This is designed to minimize the formation of obstructive fiber clots. Preferably, it is a squirrel-cage type of rotor generally designated 104, co-axial with head 96, having end disks 105 and spaced bars lying in a cylindrical arrangement, such as the elemental bars 106, preferably carrying bristles 107 to brush fibers through the perforations. The agitator must be designed to avoid lateral urging of fiber stock, in order to maintain crosswise uniformity. For example, spiral bars, like those on a lawn mower cutter, would move the stock along the rotor axis. The rotor turns at a high speed, as in a range from 175 to 600 r.p.m. Its direction is such as to cause the fibers which move with it to mesh with the heavier feed of fibers down the wall 91 of the housing 90. Thus, where the conduit 17 approaches from the right in FIGS. 1 and 2, the agitator operates best when turning counter-clockwise in FIG. 2.

The air rushing through the holes 98 carriers fibers with it as indicated by numeral 109. The path of fibers 109 is predetermined largely by a suction area under screen 10 and by positioning baffles, such as the deckle plates 72 or others. For example, there is the rear vertical baffle 71 extending nearly to the screen 10, but forward of the rear edge 111 of the suction box 40. To the extent desired, suction may extend rearwardly from baffle 71. The lower edge of baffle 71 may be so high and the suction at said edge be so reduced that a stream of the lighter-weight or fine fibers designated 112 may float out and deposit first on the screen 10 to predetermine the texture of that face. The felt F begins to form substantially at the junction of baffle 71 and screen 10, where suction functions at the line of baffle 71, building up on an incline to the final thickness under disperser 14. The density and thickness of the mat so formed may be varied over wide ranges by control of the materials and operating conditions. For example, where wood fiber with a few percent of added resin binder is to be formed into hot-pressed board at a density of 64 pounds per cu. ft., and in thicknesses of ¼ inch, the final formed mat may have a density in the range from 2 to 4 pounds per cu. ft. of oven dry fiber at corresponding thicknesses in the range from 8 to 4 inches, respectively. This may be variously divided among the several layers, each of which may differ from another in thickness and formed density. These results may be achieved with a pressure in the head of 0.1 to 1.0 inch of water, and a suction in the box 17 of about 2 to 30 inches of water, under the following described conditions of graded partial obstruction of the area of suction. For the dispersing head having the dimensions previously given above, the volume of delivery air may vary roughly in the range from 1000 to 5000 cu. ft. per minute.

A planar incline for each forming top surface of the mat signifies even distribution of fibers over the depositing area, and hence substantially uniform impact on deposition. Were the suction box 40 open directly to the screen, the greater volume of air, and hence concentration of fiber, would obtain at near the baffle 71, and the resulting mat would so resist the suction as to maintain this inequality of distribution. Accordingly, the suction is controlled and distributed to secure a planar incline to the forming top face of the mat.

The preferred means to distribute the suction in box 40, as well as in boxes 41 and 42, is to employ an open-top construction for the suction box and to provide for it changeable plates together forming a functioning cover for the open top. Numerous removable plates 115, of which the length of each runs crosswise of and under the screen 10, provide a suction platform over which the screen 10 runs. Perforations made in the plates determine the effective boundaries of the suction area. Uniformity requires the perforations to be uniform crosswise of the screen, and build-up of the mat calls for variation lengthwise of the screen. The perforations in their effective area increase forwardly of the machine, and are arranged with respect to particular conditions and materials, having as an objective the creation of the inclined plane 116 for the growing face of felt F.

As shown, the rear plate 115ᵃ is a blank or closure plate, cutting off suction to the rear of baffle 71, except for some perforations 117 in the forwardly adjacent plate 115ᵇ. The most forward plate 115ᶜ is shown also as a blank. To its rear the adjacent plate 115ᵈ is more perforate than the rearmost perforate plate 115ᵇ to compensate for the resistance of the thicker mat formed above it.

Since the deckle plates 72 lie vertically alongside the ends of the semicylindrical head 96, the suction plates 115 have their perforations extending to but not beyond the said deckle plates. Deckle plates 72 preferably do not extend beyond the forming region because of possible drag and dislocation of fibers at the lateral edges of the felt F.

FIG. 3 shows in part diagrammatically a simplified form of the apparatus shown in FIG. 1, the common parts of FIGS. 1 and 3 having the same numbers. The modification results from the use of a single suction box and suction blower for all the depositing zones, thus permitting reduction in equipment to but one suction blower and but one cyclone to recover the fines. In order that any one of the fiber dispersers may be used without the others, the connection box 60 is utilized to connect the single cyclone to any one or more of the hoppers 26, 27 and 28 feeding to the blowers for dispersers 14, 15 and 16.

In taking full advantage of a single suction box, its effect is locally negatived or controlled at various zones by the provision of blanking plates and resistance plates, as indicated in FIG. 5, and in the manner described with reference to FIG. 2.

In FIG. 3, the semicylindrical heads of the dispersers 14, 15 and 16 are shown on an inclined relation to the conveyor 10, as in FIG. 1. The dotted-line blocks 14ᵃ, 15ᵃ and 16ᵃ represent the disperser parts between the heads and the intake opening of the blowers 20, 21 and 22 of FIG. 1, the infeed conduits to the blowers being illustrated and shown as terminating in their respective hoppers 26, 27 and 28. Above these are shown the connection box 60 with its three selectable outlet conduits 37, 38 and 39, but with only one cyclone 120 feeding to it via its lower discharge outlet 121. A connection 122 in the box 60 indicates that fines from the cyclone are fed to the disperser 14.

Under conveyor 10 is one suction box 125 from which conduit 126 connects to the suction side of blower 127 discharging via conduit 128 to cyclone 120. The numeral 129 designates a series of removable cover plates, as blanks or as perforated resistances lying between the low pressure chamber 130 of box 125, and the screen conveyor 10.

FIG. 4 is a fragmentary enlarged view showing the general relation of the suction box 125 to the dispersers 14, 15 and 16. The cross-sections of the removable cover plates 129 in FIG. 4 do not exhibit the openings, if any, therethrough for suction, only because of drafting complications. However, FIG. 5 is a fragmentary view of the faces of the plates 129 which are exposed to the screen 10. The plate 131 is blank. The plate 132 is lightly perforated because of its exposure at the beginning layer of felt formation. The next plate 133 is more perforated and the extent of perforation is carried into the adjacent edge of plate 134 of which the remainder and the next plate 135 are not perforated. These areas lie under the space between the depositing zones of dispersers 14 and 15. As the mat thickens, the degree of perforation is increased, and non-depositing areas are blanked off, as indicated at 138 and 140.

The following description is given by way of example only to illustrate some of the variations in material, processing, and product, that are made possible by the present invention.

*Kinds of fiber.*—Where one of both faces are to be superior to the remainder, as a result of fiber choice, the fibers therefor may be from white fir or from western hemlock, when the remainder is Douglas fir. The fibers of white fir and of western hemlock relative to those of Douglas fir are superior in color, strength and feltability.

*Particle-size distribution.*—Consider two masses of fiber having a particle-size distribution according to the Clark classifier, as follows:

| Mesh | Coarse | Fine |
| --- | --- | --- |
| +8 | 50% | 5% |
| −8 +24 | 20% | 40% |
| −24 +50 | 10% | 20% |
| −50 +80 | 5% | 15% |
| −80 | 15% | 20% |

By using the fine fibers for relatively thin surface layers and the coarse fibers for a relatively thick core, or interior layer, a consolidated hardboard may be produced economically primarily for appearance in having smooth, fine almost textureless surfaces. By reversing the locations of the fibers, the fine fiber in the core imparts greater strength, and the coarse fiber in the faces imparts a fibrous texture.

*Solids content.*—The solids content for any layer consists of all the non-volatile material, such as fiber and additives, which remains in the final product, thus excluding free water, moisture, and other volatiles which may be present. The additives may be synthetic resin for binder or surface properties such as hardness, gloss and water-resistance; bitumen in a surface layer for weather resistance or in a core layer for tackiness useful in hot-pressing; or fire-retardant in a surface layer and preferably not in the core to avoid resulting tendering of a consolidated product.

*Moisture content.*—In making hardboard from the multi-layered felt, variation of moisture contents in the layers has different effects. A low content is the ideal, consistent with effecting the necessary plasticity of the fibers. For gloss faces in hot-pressing, fiber with higher content of water solubles is desired for the surface, with a higher concentration of the total water in the surface layers sufficient actually to wet the fibers.

Also, by locating more of the total water content in the face layers subjected to heat in hot-pressing, the moisture is more easily and faster removed.

In using a hot-press assembly in which the felt enters the press on a cold caul and is then subjected to an upper hot caul lining the upper platen, more moisture is carried in the upper face layer of the felt than in the lower, to counteract the initial contact of high temperature.

*Water solubles.*—By using fibers variously subjected to the action of steam, or not at all so treated, the water-soluble content of the fibers may be varied. Such water-soluble material functions as binder, and by wetting the face layers, it may be effectively deposited as a gloss coat against a smooth caul. For example, in using the Asplund process of U.S. No. 2,008,892 to convert raw wood to individualized fibers, the natural water-soluble content of about 4% for many woods may be easily increased by control to values in the range from 7% to 12%.

The integral layered felts above described have been especially produced for consolidation to form rigid products, such as fiber hardboard in panel form as delivered from a commercial heated multi-opening platen press. The felts may be processed as substitutes for the single-layered felts made by the single felter of my said earlier-filed copending application Serial No. 334,163. The processing, as to production of fiber with and without additives, may be the same for the multi-layered felts of the present invention as for the single-layered felt, and in accordance with the processes described in my earlier-filed copending applications Serial No. 334,164, No. 334,165, and No. 334,166, all filed January 30, 1953, said first two applications now being Patents No. 2,775,150 and No. 2,757,149, respectively, issued July 31, 1956, and said last application Serial No. 334,166, being now abandoned.

As therein disclosed, the felt is placed between heated platens at a temperature in the range from 225° F. to 500° F., preferably about 400° F., and pressed to a final density varying from 50 to 85 pounds per cu. ft. In the press, the felt may be faced by two smooth caul plates to produce a panel having two smooth sides, or one face only may have the smooth caul and the other face may have a wire screen between the felt and an adjacent caul plate or platen face, to produce a panel with one smooth face.

The various known methods of consolidation by heat and mechanical pressure can be practiced on the felt of the present invention, and in all cases the same new advantage is secured as a result of the integral felting, namely, the absence of a distinctive plane of cleavage by reason of the absence of a distinctive interface between any two layers of the felt. In addition, the advantages resulting from the presence of several different layers in the felt are numerous, as set forth above.

From the foregoing it is to be understood that the invention contemplates apparatus and methods by which economies may be effected and by which a wide variety of products may be produced.

I claim:

1. The method of making an unbonded felted fiber mat having layers of feltable fibers identified in alphabetical sequence A, etc., which comprises directing an air-suspension of material including individualized fibers A from a region of superatmospheric pressure toward a foraminous fiber-retaining member at a depositing zone thereof having subatmospheric pressure on the opposite side of said member and drawing through said member substantially all the air of said suspension, repeating the process at least once with a following fiber in the sequence and at each repetition increasing the differential pressure, whereby each deposit of adjacent fibers of the sequence felts by impact across the interface into the felt of the preceding deposit of fibers thereby forming an integral layered felt.

2. The method of making an unbonded felted fiber mat having layers of feltable fibers identified in alphabetical sequence A, etc., which comprises directing an air-suspension of material including individualized fibers A from a region of superatmospheric pressure toward a foraminous fiber-retaining member at a depositing zone thereof, establishing subatmospheric pressure by applying suction to the underside of said member at an area including said depositing zone and drawing through said member substantially all the air of said suspension, repeating the process at least once with the following fiber in the sequence and at each repetition increasing the differential pressure by increasing the suction, whereby each deposit of adjacent fibers of the sequence felts by impact across the interface into the felt of the preceding deposit of fibers thereby forming an integral layered felt.

3. The method of making an unbonded felted fiber mat having layers of feltable fibers identified in alphabetical sequence A, etc., which comprises directing an air-suspension of material including individualized fibers A from a region of superatmospheric pressure toward a foraminous fiber-retaining member at a depositing zone thereof exposed to the atmosphere, applying subatmospheric pressure to the underside of said member at an area including said depositing zone and drawing through said member substantially all the air of said suspension, repeating the process at least once with a following fiber in the sequence and at each repetition increasing the differential pressure, whereby each deposit of adjacent fibers of the sequence felts by impact across the interface into the felt of the preceding deposit of fibers thereby forming an integral layered felt.

4. The method of making an unbonded felted fiber mat having layers of feltable fibers identified in alphabetical sequence A, etc., which comprises directing an air-suspension of material including individualized fibers A from a region of superatmospheric pressure toward a foraminous fiber-retaining member at a depositing zone thereof exposed to the atmosphere, establishing subatmospheric pressure by applying suction to the underside of said member at an area including said depositing zone and drawing through said member substantially all the air of said suspension, repeating the process at least once with a following fiber in the sequence and at each repetition increasing the differential pressure by increasing the suction, whereby each deposit of adjacent fibers of the sequence felts by impact across the interface into the felt of the preceding deposit of fibers thereby forming an integral layered felt.

5. The method of making an unbonded felted fiber mat having layers of feltable fibers identified in alphabetical sequence A, etc., which comprises continuously directing an air-suspension of material including individualized fibers A from a region of superatmospheric pressure toward a continuously moving foraminous fiber-retaining member at a stationary depositing zone thereover having subatmospheric pressure on the opposite side of said member and drawing through said member substantially all the air of said suspension, repeating the process at least once with a following fiber in the sequence and at a succeeding stationary zone and at each repetition increasing the differential pressure, whereby each deposit of adjacent fibers of the sequence felts by impact across the interface into the felt of the preceding deposit of fibers thereby forming an integral layered felt.

6. The method of making an unbonded felted fiber mat having layers of feltable fibers identified in alphabetical sequence A, etc., which comprises continuously directing an air-suspension of material including individualized fibers A from a region of superatmospheric pressure toward a continuously moving foraminous fiber-retaining member at a depositing zone thereof, establishing subatmospheric pressure by applying suction to the underside of said member at an area including said depositing zone and drawing through said member substantially all the air of said suspension, repeating the process at least once with the following fiber in the sequence and at a succeeding stationary zone and at each repetition increasing the differential pressure by increasing the suction, whereby each deposit of adjacent fibers of the sequence felts by impact across the interface into the felt of the preceding deposit of fibers thereby forming an integral layered felt.

7. The method of making an unbonded felted fiber mat having layers of feltable fibers identified in alphabetical sequence A, etc., which comprises continuously directing an air-suspension of material including individualized fibers A from a region of superatmospheric pressure toward a continuously moving foraminous fiber-retaining member at a stationary depositing zone thereover exposed to the atmosphere, applying subatmospheric pressure to the underside of said member at an area including said depositing zone and drawing through said member substantially all the air of said suspension, repeating the process at least once with a following fiber in the sequence and at a succeeding stationary zone and at each repetition increasing the differential pressure, whereby each deposit of adjacent fibers of the sequence felts by impact across the interface into the felt of the preceding deposit of fibers thereby forming an integral layered felt.

8. The method of making an unbonded felted fiber mat having layers of feltable fibers identified in alphabetical sequence A, etc., which comprises continuously directing an air-suspension of material including individualized fibers A from a region of superatmospheric pressure toward a continuously moving foraminous fiber-retaining member at a stationary depositing zone thereover exposed to the atmosphere, establishing subatmospheric pressure by applying suction to the underside of said member at an area including said depositing zone and drawing through said member substantially all the air of said suspension, repeating the process at least once with a following fiber in the sequence and at a succeeding stationary zone and at each repetition increasing the differential pressure by increasing the suction, whereby each deposit of adjacent fibers of the sequence felts by impact across the interface into the felt of the preceding deposit of fibers thereby forming an integral layered felt.

9. The method of making an unbonded felted fiber mat having layers of feltable fibers identified in alphabetical sequence A, etc., which comprises continuously directing an air-suspension of material including individualized fibers A from a region of superatmospheric pressure toward a continuously moving foraminous fiber-retaining member at a stationary depositing zone thereover having subatmospheric pressure on the opposite side of said member and drawing through said member substantially all the air of said suspension, repeating the process at least once with a following fiber in the sequence and at a succeeding stationary zone and at each repetition increasing the differential pressure, whereby each deposit of adjacent fibers of the sequence felts by impact across the interface into the felt of the preceding deposit of fibers thereby forming an integral layered felt, dividing all the substance so drawn through said member into a solids-free fraction and a solids-containing fraction, and returning the solids of the solids-containing fraction to at least one of the depositing zones as a part of the air-suspension therefor.

10. The process of claim 9 wherein the said solids are returned to the first-mentioned depositing zone as a part of the air-suspension therefor.

11. The method of making an unbonded felted fiber mat having layers of feltable fibers identified in alphabetical sequence A, etc., which comprises continuously directing an air-suspension of material including individualized fibers A from a region of superatmospheric pressure toward a continuously moving foraminous fiber-retaining member at a depositing zone thereof, establishing subatmospheric pressure by applying suction to the underside of said member at an area including said depositing zone and drawing through said member substantially all the air of said suspension, repeating the process at least once with the following fiber in the sequence and at a succeeding stationary zone and at each repetition increasing the differential pressure by increasing the suction, whereby each deposit of adjacent fibers of the sequence felts by impact across the interface into the felt of the preceding deposit of fibers thereby forming an integral layered felt, dividing all the substance so drawn through said member into a solids-free fraction and a solids-containing fraction, and returning the solids of the solids-containing fraction to at least one of the depositing zones as a part of the air-suspension therefor.

12. The process of claim 11 wherein the said solids are returned to the first-mentioned depositing zone as a part of the air-suspension therefor.

13. The method of making an unbonded felted fiber mat having layers of feltable fibers identified in alphabetical sequence A, etc., which comprises continuously directing an air-suspension of material including individualized fibers A from a region of superatmospheric pressure toward a continuously moving foraminous fiber-retaining member at a stationary depositing zone thereover exposed to the atmosphere, applying subatmospheric pressure to the underside of said member at an area including said depositing zone and drawing through said member substantially all the air of said suspension, repeating the process at least once with a following fiber in the sequence and at a succeeding stationary zone and at each repetition increasing the differential pressure, whereby each deposit of adjacent fibers of the sequence felts by impact across the interface into the felt of the preceding deposit of fibers thereby forming an integral layered felt, dividing all the substance so drawn through said member into a solids-free fraction and a solids-containing fraction, and returning the solids of the solids-containing fraction to at least one of the depositing zones as a part of the air-suspension therefor.

14. The process of claim 13 wherein the said solids are returned to the first-mentioned depositing zone as a part of the air-suspension therefor.

15. The method of making an unbonded felted fiber mat having layers of feltable fibers identified in alphabetical sequence A, etc., which comprises continuously directing an air-suspension of material including individualized fibers A from a region of superatmospheric pressure toward a continuously moving foraminous fiber-retaining member at a stationary depositing zone thereover exposed to the atmosphere, applying subatmospheric pressure to the underside of said member at an area including said depositing zone and drawing through said member substantially all the air of said suspension, repeating the process at least once with a following fiber in the sequence and at a succeeding stationary zone and at each repetition increasing the differential pressure, whereby each deposit of adjacent fibers of the sequence felts by impact across the interface into the felt of the preceding deposit of fibers thereby forming an integral layered felt, separately dividing all the substance so drawn through said member at each depositing zone into a solids-free fraction and a solids-containing fraction, and returning all the solids of the solids-containing fractions to at least one of the depositing zones as a part of the air-suspension therefor.

16. The process of claim 15 wherein the said solids are returned to the first-mentioned depositing zone as a part of the air-suspension therefor.

17. The method of making an unbonded felted fiber mat having layers of feltable fibers identified in alphabetical sequence A, etc., which comprises continuously directing an air-suspension of material including individualized fibers A from a region of superatmospheric pressure toward a continuously moving foraminous fiber-retaining member at a stationary depositing zone thereover having a sufficiently constant subatmospheric pressure on the opposite side of said member to draw through said member substantially all the air of said suspension and air from the atmosphere surrounding said suspension, said suspension predominating in air drawn directly from a fiber-free region at atmospheric pressure, repeating the process at least once with a following fiber in the sequence and at a succeeding stationary zone, whereby each deposit of adjacent fibers of the sequence felts by impact across the interface into the felt of the preceding deposit of fibers thereby forming an integral layered felt, the fibers forming at least one of said layers being fed in association with material of smaller particle size than the fibers of all the layers, dividing all the substance so drawn through said member into a solids-free fraction and a solids-containing fraction, delivering the solids-free fraction to a region at atmospheric pressure, delivering at least the solids of the solids-containing fraction to an independent stream of air, and returning the solids of the solids-containing fraction by means of said independent air stream to at least one of the depositing zones as part of the air suspension therefor.

18. The process of claim 17 wherein the said solids are returned to the first-mentioned depositing zone as a part of the air-suspension therefor.

19. The method of making an unbonded felted fiber mat having layers of feltable fibers identified in alphabetical sequence A, etc., which comprises continuously directing an air-suspension of material including individualized fibers A from a region of superatmospheric pressure toward a continuously moving foraminous fiber-retaining member at a stationary depositing zone thereover, applying subatmospheric pressure to the underside of said member at an area including said depositing zone and drawing through said member substantially all the air of said suspension and air from the atmosphere surrounding said suspension, said suspension predominating in air drawn directly from a fiber-free region at atmospheric pressure, repeating the process at least once with the following fiber in the sequence and at a succeeding stationary zone, whereby each deposit of adjacent fibers of the sequence felts by impact across the interface into the felt of the preceding deposit of fibers thereby forming an integral layered felt, the fibers forming at least one of said layers being fed in association with material of smaller particle size than the fibers of all the layers, dividing all the substance so drawn through said member into a solids-free fraction and a solids-containing fraction, delivering the solids-free fraction to a region at atmospheric pressure, delivering at least the solids of the solids-containing fraction to an independent stream of air, and returning the solids of the solids-containing fraction by means of said independent air stream to at least one of the depositing zones as part of the air suspension therefor.

20. The process of claim 19 wherein the said solids are returned to the first-mentioned depositing zone as a part of the air-suspension therefor.

21. The method of making an unbonded felted fiber mat having layers of feltable fibers identified in alphabetical sequence A, etc., which comprises continuously directing an air-suspension of material including individualized fibers A from a region of superatmospheric pressure toward a continuously moving foraminous fiber-retaining member at a stationary depositing zone thereover exposed to the atmosphere, applying subatmospheric pressure to the underside of said member at an area including said depositing zone and drawing through said member substantially all the air of said suspension and air from the atmosphere surrounding said suspension, said suspension predominating in air drawn directly from a fiber-free region at atmospheric pressure, repeating the process at least once with a following fiber in the sequence and at a succeeding stationary zone, whereby each deposit of adjacent fibers of the sequence felts by impact across the interface into the felt of the preceding deposit of fibers thereby forming an integral layered felt, the fibers forming at least one of said layers being fed in association with material of smaller particle size than the fibers of all the layers, dividing all the substance so drawn through said member into a solids-free fraction and a solids-containing fraction, delivering the solids-free fraction to a region at atmospheric pressure, delivering at least the solids of the solids-containing fraction to an independent stream of air, and returning the solids of the solids-containing fraction by means of said independent air stream to at least one of the depositing zones as part of the air suspension therefor.

22. The process of claim 21 wherein said solids are returned to the first-mentioned depositing zone as a part of the air-suspension therefor.

23. The method of making an unbonded felted fiber mat having layers of feltable fibers identified in alphabetical sequence A, etc., which comprises continuously directing an air-suspension of material including individualized fibers A from a region of superatmospheric pressure toward a continuously moving foraminous fiber-retaining member at a stationary depositing zone thereover, applying subatmospheric pressure to the underside of said member at an area including said depositing zone and drawing through said member substantially all the air of said suspension and air from the atmosphere surrounding said suspension, said suspension predominating in air drawn directly from a fiber-free region at atmospheric pressure, repeating the process at least once with a following fiber in the sequence at a succeeding stationary zone, whereby each deposit of adjacent fibers of the sequence felts by impact across the interface into the felt of the preceding deposit of fibers thereby forming an integral layered felt, the fibers forming at least one of said layers being fed in association with material of smaller particle size than the fibers of all the layers, separately dividing all the substance so drawn through said member into a solids-free fraction and a solids-containing fraction, delivering the solids-free fraction to a region at atmospheric pressure, delivering at least solids of the solids-containing fraction to an independent stream of air, and returning the solids of the solids-containing fraction by means of said independent air stream to at least one of the depositing zones as part of the air suspension therefor.

24. The method of making an unbonded felted fiber mat having layers of feltable fibers identified in alphabetical sequence A, etc., which comprises continuously directing an air-suspension of material including individualized fibers A from a region of superatmospheric pressure toward a continuously moving foraminous fiber-retaining member at a stationary depositing zone thereover exposed to the atmosphere, applying subatmospheric pressure to the underside of said member at an area including said depositing zone and drawing through said member substantially all the air of said suspension and air from the atmosphere surrounding said suspension, said suspension predominating in air drawn directly from a fiber-free region at atmospheric pressure, repeating the process at least once with a following fiber in the sequence and at a succeeding stationary zone, whereby each deposit of adjacent fibers of the sequence felts by impact across the interface into the felt of the preceding deposit of fibers thereby forming an integral layered felt, the fibers forming at least one of said layers being fed in association with material of smaller particle size than the fibers of all the layers, separately dividing all the substance so drawn through said member at each depositing zone into a solids-free fraction and a solids-containing fraction, delivering at least the solids of all of said solids-containing fractions by means of an independent air-stream to at least one of the depositing zones as a part of the air-suspension therefor.

25. Apparatus comprising a movable foraminous fiber-retaining member on which to form a felt of fibers, a plurality of means alined in the direction of movement of said member for discharging from a region of super-atmospheric pressure air and material including individualized fibers onto one face of said member to form a felt, each of said means including a blower arranged to deliver air drawn in part at least directly from a region at atmospheric pressure and including connecting means for conveying air from said blower to said region at superatmospheric pressure, suction-box means at the opposite face of said member at areas opposite all of said discharging means, suction-producing means connected to said suction box means for drawing all the air and suspended solids which pass through said member from all of said discharging means, fractionating means connected to receive the discharge of air and solids from said suction-producing means and adapted to divide said discharge into air which is substantially free of said solids and a remainder containing substantially all of said solids, and connecting means arranged to deliver at least the solids of said remainder to the inlet of at least one of said blowers.

26. Apparatus comprising a movable foraminous fiber-retaining member on which to form a felt of fibers, a plurality of means alined in the direction of movement of said member for discharging from a region of super-atmospheric pressure air and material including individualized fibers onto one face of said member to form a felt, each of said means including a blower arranged to deliver air drawn in part at least directly from a region at atmospheric pressure and including connecting means for conveying air from said blower to said region at superatmospheric pressure, suction-box means at the opposite face of said member at areas opposite all of said discharging means, suction-producing means connected to said suction box means for drawing all the air and suspended solids which pass through said member from all of said discharge means, fractionating means connected to receive the discharge of air and solids from said suction-producing means and adapted to divide said discharge into air which is substantially free of said solids and a remainder containing substantially all of said solids, and connecting means arranged to deliver at least the solids of said remainder to the inlet of the blower of said first-depositing one of said discharging means.

27. Apparatus comprising a movable foraminous fiber-retaining member on which to form a felt of fibers, a plurality of means alined in the direction of movement of said member for discharging from a region of super-atmospheric pressure air and material including individualized fibers onto one face of said member to form a felt, each of said means including a blower arranged to deliver air drawn in part at least directly from a region at atmospheric pressure and including connecting means for conveying air from said blower to said region at superatmospheric pressure, individual suction-box means for each of said discharging means at the opposite face of said member and opposite each of said discharging means, separate suction-producing means connected to each suction-box means for drawing air and suspended solids which pass through said member, fractionating means connected to receive the discharged air and solids from all of said suction-producing means and adapted to divide said discharged air and solids into air which is substantially free of said solids and at least one solids-containing fraction, and connecting means arranged to deliver at least the solids thereof to at least one of said blowers, fractioning means connected to receive the discharge of all of said suction-producing means for dividing the air-suspension from said suction-box means into solids-free air and at least one solids-containing fraction, and connecting means for conducting the solids from said fractionating means to at least one of said discharging means.

28. Apparatus comprising a movable foraminous fiber-retaining member on which to form a felt of fibers, a plurality of means alined in the direction of movement of said member for discharging from a region of super-atmospheric pressure air and material including individualized fibers onto one face of said member to form a felt, each of said means including a blower arranged to deliver air drawn in part at least directly from a region at atmospheric pressure and including connecting means for conveying air from said blower to said region at superatmospheric pressure, individual suction-box means for each of said discharging means at the opposite face of said member and opposite each of said discharging means, separate suction-producing means connected to each suction-box means for drawing air and suspended solids which pass through said member, fractioning means connected to receive the discharged air and solids from at least one of said suction-producing means and adapted to divide said discharged air and solids into air which is substantially free of said solids and at least one solids-containing fraction, and connecting means arranged to deliver at least the solids thereof to at least one of said blowers.

29. Apparatus comprising a movable foraminous fiber-retaining member on which to form a felt of fibers, a plurality of means alined in the direction of movement of said member for discharging from a region of super-atmospheric pressure air and material including individualized fibers onto one face of said member to form a felt, each of said means including a blower arranged to deliver air drawn in part at least directly from a region at atmospheric pressure and including connecting means for conveying air from said blower to said region at superatmospheric pressure, individual suction-box means for each of said discharging means at the opposite face of said member and opposite each of said discharging means, separate suction-producing means connected to each suction-box means for drawing air and suspended solids which pass through said member, separate fractionating means connected to receive the discharge of air and solids of each suction-producing means and adapted to divide said discharge into air which is substantially free of solids and a remainder containing substantially all of the solids of said discharge, and connecting means arranged to deliver at least the solids of said remainders to the inlet of at least one of said blowers.

30. Apparatus comprising a movable foraminous fiber-retaining member on which to form a felt of fibers, a plurality of means alined in the direction of movement of said member for discharging from a region of super-atmospheric pressure air and material including individualized fibers onto one face of said member to form a felt, each of said means including a blower arranged to deliver air drawn in part at least directly from a region at atmospheric pressure and including connecting means for conveying air from said blower to said region at superatmospheric pressure, individual suction-box means for each of said discharging means at the opposite face of said member and opposite each of said discharging means, separate suction-producing means connected to each suction-box means for drawing air and suspended solids which pass through said member, separate fractionating means connected to receive the discharge of air and solids of each suction-producing means and adapted to divide said discharge into air which is substantially free of solids, and a remainder containing substantially all of the solids of said discharge, and connecting means arranged to deliver at least the solids of said remainders to the inlet of the blower of the first-depositing one of said discharging means.

31. Apparatus comprising a movable foraminous fiber-retaining member on which to form a felt of fibers, a plurality of means alined in the direction of movement of said member for discharging from a region of superatmospheric pressure air and material including individualized fibers onto one face of said member to form a felt, each of said means including a blower arranged to deliver air drawn in part at least directly from a region at atmospheric pressure and including connecting means for conveying air from said blower to said region at superatmospheric pressure, individual suction-box means for each of said discharging means at the opposite face of said member and opposite each of said discharging means, separate suction-producing means connected to each suction-box means for drawing air and suspended solids which pass through said member, separate fractionating means connected to receive the discharge of air and solids of each suction-producing means and adapted to divide said discharge into air which is substantially free of solids and a remainder containing substantially all of the solids of said discharge, and connecting means arranged to deliver at least the solids of the discharges from all of said suction box means to the inlet of at least one of said blowers including connecting means for delivering the solids deriving from the first-discharging means to the inlet of the blower of said first-discharging means.

32. The method which comprises forming an integrally felted unbonded fiber mat by a succession of steps each depositing as a layer of felt material containing individualized feltable fibers, the deposition of fibers in each step being effected by carriage in a vehicle of air imparting controlled impact whereby the initially deposited fibers of any step on a layer of felt are projected into said layer with resulting interfelting of adjacent layers, the moisture content of a surface layer being appreciably greater than that of the adjacent layer, and before equalization of total moisture content and while said surface layer maintains said appreciably greater moisture content consolidating the mat in horizontal position with said surface layer uppermost by the application of mechanical pressure and heat at a temperature well above 212° F., whereby said moisture content of said surface layer retards the heating thereof and is in part driven to the adjacent layer.

33. The process of claim 32 in which the fibers are wood fibers containing water-solubles deriving from the substance native to the wood, and in which the said surface layer has wet fibers whereby to produce a surface glaze.

34. The method of making an unbonded felted fiber mat having layers of feltable fibers identified in alphabetical sequence A, etc., which comprises continuously directing an air-suspension of material including individualized fibers A from a region of superatmospheric pressure toward a continuously moving foraminous fiber-retaining member at a stationary depositing zone thereover, applying subatmospheric pressure to the underside of said member at an area including said depositing zone and drawing through said member substantially all the air of said suspension, repeating the process at least once with a following fiber in the sequence at a succeeding stationary zone, whereby each deposit of adjacent fibers of the sequence felts by impact across the interface into the felt of the preceding deposit of fibers thereby forming an integral layered felt, the fibers forming at least one of said layers being fed in association with material of smaller particle size than the fibers of all the layers, separately dividing all the substance so drawn through said member at each depositing zone into a solids-free fraction and a solids-containing fraction, and returning all the solids of the solids-containing fractions to the first-mentioned depositing zone as a part of the air-suspension therefor.

35. The method of making an unbonded felted fiber mat having layers of feltable fibers identified in alphabetical sequence A, etc., which comprises continuously directing an air-suspension of material including individualized fibers A from a region of superatmospheric pressure toward a continuously moving foraminous fiber-retaining member at a stationary depositing zone thereover exposed to the atmosphere, applying subatmospheric pressure to the underside of said member at an area including said depositing zone and drawing through said member substantially all the air of said suspension, repeating the process at least once with a following fiber in the sequence and at a succeeding stationary zone, whereby each deposit of adjacent fibers of the sequence felts by impact across the interface into the felt of the preceding deposit of fibers thereby forming an integral layered felt, the fibers forming at least one of said layers being fed in association with material of smaller particle size than the fibers of all the layers, separately dividing all the substance so drawn through said member at each depositing zone into a solids-free fraction and a solids-containing fraction, and returning all the solids of the solids-containing fractions to the first-mentioned depositing zone as a part of the air-suspension therefor.

References Cited in the file of this patent

UNITED STATES PATENTS

| | | |
|---|---|---|
| 1,929,344 | Benoit | Oct. 3, 1933 |
| 1,967,291 | Crandell et al. | July 24, 1934 |
| 2,569,765 | Kellett et al. | Oct. 2, 1951 |
| 2,698,271 | Clark | Dec. 28, 1954 |
| 2,712,171 | Hoffman | July 5, 1955 |
| 2,743,758 | Uschmann | May 1, 1956 |
| 2,807,054 | Burger et al. | Sept. 24, 1957 |
| 2,890,497 | Langdon et al. | June 16, 1959 |
| 2,912,723 | Roberts | Nov. 17, 1959 |

UNITED STATES PATENT OFFICE
CERTIFICATE OF CORRECTION

Patent No. 2,993,239                          July 25, 1961

Clark C. Heritage

It is hereby certified that error appears in the above numbered patent requiring correction and that the said Letters Patent should read as corrected below.

Column 2, line 28, for "or" read -- of --; column 4, line 18, after "as" insert -- to --; line 24, for "dispenser" read -- disperser --; line 28, for "thet" read -- the --; line 30, for "January 20, 1953" read -- January 30, 1953 --; column 10, line 47 for "of", second occurrence, read -- or --; column 11, line 47, for "2,775,150" read -- 2,757,150 --; column 18, line 12, for "blowers," read -- blowers. --; same line 12, beginning with "fractioning means", strike out all to and including "charging means." in line 18, same column 18.

Signed and sealed this 5th day of December 1961.

(SEAL)
Attest:

ERNEST W. SWIDER                         DAVID L. LADD
Attesting Officer                           Commissioner of Patents

USCOMM-DC